United States Patent [19]

Ferraresi et al.

[11] Patent Number: 4,703,090

[45] Date of Patent: Oct. 27, 1987

[54] METHOD FOR THE PREPARATION OF GRAFT COPOLYMERS BY EMULSION COPOLYMERIZATION

[75] Inventors: Andrea Ferraresi; Pierluigi Griselli, both of Ferrara, Italy

[73] Assignee: Enichem Polimeri S.p.A., Sassari, Italy

[21] Appl. No.: 806,974

[22] Filed: Dec. 9, 1985

[30] Foreign Application Priority Data

Dec. 18, 1984 [IT] Italy ................................ 24113 A/84

[51] Int. Cl.[4] .......................................... C08F 279/04
[52] U.S. Cl. .................................... 525/246; 525/250; 525/261; 525/262; 525/316; 525/942
[58] Field of Search ............... 525/316, 246, 250, 261, 525/262, 942

[56] References Cited

U.S. PATENT DOCUMENTS

| | | | |
|---|---|---|---|
| 3,442,979 | 6/1969 | Ott et al. | 525/316 |
| 3,509,238 | 4/1970 | Aubrey et al. | 525/316 |
| 3,663,656 | 5/1972 | Ford et al. | 525/265 |
| 4,221,883 | 9/1980 | Mott et al. | 525/246 |

Primary Examiner—Wilbert J. Briggs, Sr.
Attorney, Agent, or Firm—Hedman, Gibson, Costigan & Hoare

[57] ABSTRACT

Graft copolymers are prepared by means of a two-step polymerization process, in emulsion: in the first step, a vinylaromatic monomer and an acryl or metacryl monomer are grafted on a monomodal polybutadiene latex constituted of particles of diameter comprised within the range of from 800 to 2500 Å. The polymerization/grafting reaction is continued up to a 70-90% conversion, at which time a further portion of monomodal polybutadiene is added, together with further amounts of said monomers, always in emulsion.

17 Claims, No Drawings

METHOD FOR THE PREPARATION OF GRAFT COPOLYMERS BY EMULSION COPOLYMERIZATION

The present invention relates to a process for the preparation of graft copolymers, process consisting in polymerizing a mixture of a vinylaromatic monomer and an acrylic monomer, in the presence of monomodal polybutadiene, making reaction proceed up to a certain conversion level, and in the subsequent addition of a further amount of monomodal polybutadiene in the presence of additional amounts of vinylaromatic and acrylic monomers, both steps being carried out in emulsion.

It is known that is some uses, e.g., in the particular case of ABS resin production, latexes with polymeric particles smaller than 800 Å do not give satisfactory results, in that ABS resins obtained from them do not show good resilience and processability characteristics, for which qualities having available, as an intermediate, a latex of polybutadiene whose particles have, at least partly, an average diameter not lower than 2000 Å, and preferably comprised within the range of from 3000 to 7000 Å is necessary. In order to obtain such a latex, techniques characterized by low reaction rates and long polymerization times (up to 70 hours) are used.

The polymerization can be effected as well over short times, on condition that the diameter of a portion of particles be increased by means of a suitable agglomeration process, generally executable at the end of polymerization itself.

To the purpose of increasing the diameter of polymeric particles of a polybutadiene latex, different techniques are known, such as freezing, passage of latex under pressure through suitable very small diameter orifices, addition of electrolytes, organic solvents, water-soluble polymers, and so on.

Such techniques show considerable disadvantages, such as high energy consumption, probable formation of large amounts of coagulum, strong dependance of agglomeration on temperature and time, mechanical instability of coagulated latex, and difficulty in controlling and reproducing the distribution of agglomerated particles' size.

It is also known (Italian patent application No. 27574 A/79 of Nov. 27th, 1979), that a latex of rubbery polymer can be agglomerated by adding to it an agglomerating latex containing a polymer different from the one to be agglomerated (e.g., a polycrylate), and a suitable surfactant.

On the other hand, always in the field of ABS resins, it is known that end products with good resilience and processability, combined with a very good surface appearance can be obtained by using a bimodal polybutadiene without having to increase the diameter of starting polymer particles: in fact, low-diameter polybutadiene particles (with diameter comprised within the range of from 800 to 2500 Å) confer a good surface appearance, whilst those with greater diameter (comprised within the range of from 3000 to 8000 Å) guarantee, as mentioned, the obtaining of an end product with good resilience combined with a high processability.

The present invention allows a polybutadiene graft copolymer to be obtained which, when used in preparing ABS resins, allows the hereinabove reminded beneficial effects to be achieved, without resorting to agglomeration techniques, either in the presence, or not, of a polymer different from the polybutadiene contained in the latex concerned, and simply using a monomodal polybutadiene.

It is indeed the object of the present patent application a process for the preparation of graft copolymers, consisting in the preliminary polymerization of a mixture of a vinylaromatic monomer and an acrylic monomer in the presence of a monomodal polybutadiene, with the diameter of particles being comprised within the range of from 800 to 2500 Å, and in the subsequent addition, when the conversion has arrived to a level of about 70–90%, of a further amount of monomodal polybutadiene, together with further amounts of said monomers, the whole process being carried out in emulsion.

The process according to the invention allows thus a product with outstanding properties and characteristics to be obtained, and is applied, as said, to the preparation of those graft copolymers which are usually obtained by grafting-polymerization of a mixture of monomers comprising at least a vinylaromatic derivative, and at least an acrylic or metacrylic derivative on an elastomeric substrate containing olefinic bonds, grafting-polymerization which is accomplished by sequentially using the techniques of emulsion polymerization and of suspension polymerization, as recently disclosed in European patent application No 462.

Contrarily to the teachings of known art and, from a certain viewpoint, at all surprising, as resorting to the use of emulsion process to accomplish what provided by the said European patent application has been sometimes discouraged, the process according to the present invention is characterized by a first step of polymerization in aqueous emulsion, during which a mixture of monomers constituted by at least a vinylaromatic derivative and at least an acryl or metacryl derivative is polymerized in the presence of a latex of monomodal polybutadiene, step of polymerization to which an amount of polybutadiene of up to 90% of the total amount envisaged is supplied, and which is continued up to a conversion level of introduced monomers comprised within the range of from 70 to 90%, and by a subsequent step, always in emulsion, during which the residual amount of monomodal polybutadiene and additional amounts of above-said monomers are supplied.

The polybutadiene latex useable in the grafting-polymerization according to the present invention comprises a monomodal polymer characterized by an extremely narrow granulometric distribution, the average particle diameter being comprised within the range of from 800 to 2500 Å and, preferably, within the range of from 1300 to 1600 Å.

In the first polymerization step, up to 90% is used of the overall amount of polybutadiene which shall enter into the end composition of graft polymer, the residual amount being added during the second step, when the grafting-polymerization reaction has exceeded the 70–90% conversion level, relatively to monomers introduced.

The grafting in emulsion is favoured by the presence of stabilizers-emulsifiers, directly inside polybutadiene latex.

Stabilizer systems are those usually used to that purpose, such, e.g., the soaps of fatty acids, alkyl- or arylalkyl sulphonates, the salts of resin acids: of particular interest has resulted the use of a potassium alkylsulphonate, and the sodium salt of disproportionated resin acid.

The monomers to be polymerized and grafted can be introduced throughout the step of emulsion polymerization; they can be introduced as well separately or as mixtures, continuously or as sequential batches, as such or suitably emulsified.

As mentioned, the grafting-polymerization envisages the use, according to what just mentioned, of a mixture comprising at least a vinylaromatic derivative, and at least an acryl or metacryl derivative.

Among vinylaromatic derivatives, styrene, α-methylstyrene, substituted styrenes can be mentioned: above all, styrene.

Among acryl or metacryl derivatives to exemplifying purposes acryl acid and metacryl acid, methyl acrylate, ethyl acrylate, and corresponding metacrylates, acrylonitrile and metacrylonitrile can be mentioned.

Of particular interest results the use of styrene-acrylonitrile and styrene-acrylonitrile-α-methylstyrene, in particular in view of the subsequent use of graft polymer for the preparation of ABS resins.

In the just mentioned case, the monomers are used in weight ratios, styrene/acrylonitrile, ranging from 60/40 to 80/20, preferably of 70/30.

The reaction is carried out at a temperature comprised within the range of from 50 to 80° C., in the presence of an initiator selected among water-soluble initiators, traditionally efficacious in emulsion polymerization, of peroxide type: potassium persulphate or ammonium persulphate, organic peroxides, hydroperoxides and peracids.

Such water-soluble catalysts may or may not be activated with reducing agents to form redox systems.

The reducing agents preferred can be sodium bisulphite or salts or complexes of iron ions or of ions of low-valence transition metals, such as cobalt, nickel and copper.

The amount of initiator must be comprised within the range of from 0.001 to 3.0 pphm, and preferably of from 0.005 to 1.0 pphm; particularly indicated has resulted to be the use of complex redox system $Fe^{2+}$-EDTA/cumene hydroperoxide, and of potassium persulphate.

Of course, any other catalyst known for this type of reaction can be used to accomplish the grafting-polymerization reaction according to the present invention.

Chain-transfer agents are used to adjust graft copolymer's molecular weight, and to control polymer fluidity. The most commonly used are straight or branched mercaptans, thioethers, α-methylstyrene dimers, certain olefinic compounds and terpenic derivatives.

The amount of chain-transfer agent must be comprised within the range of from 0.001 to 1.0% by weight.

When the partial conversion of monomers supplied has reached the level of 70-90% by weight, the addition of the residual amount of monomodal polybutadiene latex is started (up to 20% of the total to be used at maximum).

Such polydutadiene can have a granulometry with mode centre different from the one initially charged, but always with distribution monomodal and comprised within the range as defined.

Together with polybutadiene, additional amounts of the same monomers as used in the first step are added.

The reaction temperature, the operating modalities, the emulsifier agents and the catalysts are the same as provided for the carrying out of the first step.

When the conversion exceeds the 94-96% level, the reaction is stopped by means of the addition of a suitable inhibitor (e.g., hydroxylamine sulphate).

The process mentioned, being the object of the present invention, allows graft copolymers containing a polybutadiene amount comprised within the range of from 10 to 70%, preferably of from 40 to 60%, to be obtained.

All what previously disclosed and other operating modalities shall result more evident from the reading of the following illustrative examples, which are not however be intended as limitative of the invention.

EXAMPLE 1

Into a glass reaction vessel of 5 l in capacity, 40 pphm of polybutadiene latex with a concentration of 34.8% and whose characteristics are reported in Table 1; and 3.5 pp (referred to dry polybutadiene) of a surfactant of alkyl-sulphonate type in solution at 23% are added.

Reactor's temperature in increased to T=70° C. under stirring (rpm=250) and under a slight nitrogen atmosphere.

The 1st step is then started, with the continuous feeding of the following emulsion of monomers:

| | |
|---|---|
| Styrene | 30.4 pphm |
| acrylonitrile | 9.6 pphm |
| demineralized water | 44.5 pphm |
| alkyl-sulphonate | 0.64 pphm |
| NaOH | 0.08 pphm |
| Na—formaldehyde sulphoxylate | 0.12 pphm |

The continuous feeding of the monomer mixture is carried out by means of a metering pump, which is so adjusted as to supply the emulsion over $2^h30'$.

Contemporaneously to the monomer emulsion the initiator is separately supplied, over a $3^h45'$ time, composed by the following redox system:

| | |
|---|---|
| $Fe^{++}$/EDTA complex | 0.067 pphm |
| cumene hydroperoxide | 0.094 pphm |

At the end of monomer emulsion feeding, when the partial conversion is of about 70-80% by weight, the 2nd step begins.

Over a time of 5', 10 pphm of polybutadiene having the same characteristics as that used in the 1st step are added, and then sequentially the following monomer emulsion:

| | |
|---|---|
| Styrene | 7.6 pphm |
| acrylonitrile | 2.4 pphm |
| demineralized water | 11 pphm |
| alkyl-sulphonate | 0.16 pphm |
| NaOH | 0.02 pphm |
| Na—formaldehyde sulphoxylate | 0.03 pphm | is added.

This emulsion is added over a 10' time by a metering pump. At the end of the catalytic system feeding, the reaction mass is kept standing at T=70° C. over $1^h$. This allows achieving a conversion of 94-96% with an end yield of dry matter of 37%.

At the end of the reaction, a reaction inhibitor (0.08 pphm of hydroxylamine sulphate) is added.

The residual unreacted monomers are removed by steam stream extraction at T=100° C. over $1^h30'$.

Graft polybutadiene so obtained is coagulated with a solution of CaCl$_2$ at 35%, separated, washed and dried at T=70°-80° C. in fluid-bed drier.

Dried material is thed blended in a Banbury-type blender with a styrene-acrylonitrile copolymer with a ST/ACN ratio=71/29, respectively in the ratios:

| graft polymer/ST-ACN copolymer: | 1 - 20/80 |
|---|---|
| | 2 - 35/65 |
| | 3 - 50/50 |
| | 4 - 70/30 |

In Table No 2 the physical-mechanical properties are evidenced of the products obtained with the ratios as mentioned.

EXAMPLE 2

Similarly to Example No 1, at the beginning of the reaction the same amounts of polybutadiene and alkyl-sulphonate type surfactant are used.

Always with stirring and under nitrogen atmosphere, reaction bath temperature is increased to T=60° C. When this temperature is reached, 0.3 pphm of K$_2$S$_2$O$_8$ in solution at 4% are charged. The monomer emulsion, so formed:

| Styrene | 30.4 pphm |
|---|---|
| acrylonitrile | 9.6 pphm |
| demineralized water | 44 pphm |
| tert.dodecyl-mercaptane | 0.4 pphm |
| Na salt of disproportionated resin acid | 0.8 pphm | is then added, continuously over 3 hours.

At the end of monomer addition, when partial conversion is about 70-80%, the 2nd step begins.

Over 5', 0.2 pphm of K$_2$S$_2$O$_8$ in solution at 4% and 10 pphm of polybutadiene (same characteristics as of that used in the 1st step) are added. Over 10 minutes the following monomer emulsion is then charged:

| Styrene | 7.6 pphm |
|---|---|
| acrylonitrile | 2.4 pphm |
| demineralized water | 11.5 pphm |
| tert.dodecyl-mercaptan | 0.1 pphm |
| Na-salt of disproportionated resin acid | 0.2 pphm |

At the end of the feeding, the reaction mass is kept standing at T=60° C. over 3$^h$30', with an end conversion of 95-97%, and a dry matter production of 37%.

The coagulation and drying modalities, and the mixing ratios with styrene-acrylonitrile copolymer are the same as reported in Example No. 1.

In Table No 3, the physical-mechanical properties of the products obtained are evidenced.

(COMPARATIVE) EXAMPLE 3 (Monomodal PB, and single step)

Into a glass reaction vessel of 5 l of capacity, 50 pphm of a polybutadiene latex, whose characteristics are reported in Table No 1, and 3.5 pp (referred on polybutadiene dry weight) of a surfactant of alkyl-sulphonate type in solution at 23% are added.

Reactor's temperature is increased to T=70° C., under stirring, (250 RPM)/and under a slight nitrogen atmosphere.

When temperature mentioned is reached, the continuous feeding over a 2$^h$45' time begins of following emulsion:

| Styrene | 38 pphm |
|---|---|
| acrylonitrile | 12 pphm |
| demineralized water | 55.5 pphm |
| alkyl-sulphonate | 0.80 pphm |
| NaOH | 0.10 pphm |
| Na—Formaldehyde sulphoxylate | 0.15 pphm |

Contemporaneously to the monomer feed, the initiator, composed by the following redox system:

| Fe$^{+++}$/EDTA | 0.067 pphm |
|---|---|
| Cumene hydroperoxide | 0.094 pphm | is separately supplied, in continuous, over a 3$^h$45' time.

At the end of catalytic system feeding, the reaction mass is kept standing at T=70° C. over one hour. This allows a conversion of 94-96%, with and end dry matter production of 37%, to be reached.

At the end of the reaction, a reaction inhibitor (0.08 pphm of hydroxylamine) is added.

The residual unreacted monomers are removed by steam stream extraction at T=100° C. over 1$^h$30'.

Graft polybutadiene so obtained is coagulated with a CaCl$_2$ solution at 35%, separated, washed and dried at T=70°-80° C. in fluid bed drier.

Dried matter is then blended in a Banbury-type blender with a styrene-acrylonitrile copolymer, having a St/ACN ratio=71/29, respectively in the ratios:

| graft polymer/St/ACN copolymer: | 1 - 20/80 |
|---|---|
| | 2 - 35/65 |
| | 3 - 50/50 |

In Table No 4 the physical-mechanical properties of obtained products are reported.

(COMPARATIVE) EXAMPLE 4 (Bimodal PB and one step only)

The formulation and operating modalities are the same as those reported in comparative Example No 3, with the exception that polybutadiene latex has a bimodal granulometric distribution, with mode centres respectively at 1500 Å and 4000 Å, and hence with an overall particle distribution within the range of from 800 to 7000 Å.

The blending ratios with styrene-acrylonitrile are the same as shown in comparative Example No 3.

In Table No 5 the physical-mechanical properties of products obtained are evidenced.

TABLE NO 1

| Characteristics of Polybutadiene latex | |
|---|---|
| pH | 8.0 — |
| Surface tension | 66.4 dyne/cm |
| Average surface diameter | 1500 Å |
| Mooney Viscosity (ML 1 + 4, T = 100° C.) | 90 — |
| Gel content | 87 % pp |
| Swelling index | 17 % pp |
| Dry content | 34.8 % pp |
| Surfactant covering on particles | 27.5 % pp |

TABLE No 2

Physical-mechanical characteristics of ABS resins obtained by two-step grafting of PB.

|  |  | Experimental Examples | | | |
|---|---|---|---|---|---|
|  |  | 1 | 2 | 3 | 4 |
| Graft polymer fraction % pp | | 20 | 35 | 50 | 70 |
| ST/ACN copolymer fraction % pp | | 80 | 65 | 50 | 30 |
| Resilience, IZOD ¼" + 23° C. J/m (ASTM D-256) | | 40 | 210 | 330 | 330 |
| Hardness "R" — (ASTM D-785) | | 118 | 112 | 102 | 87 |
| Helix fluidity: T = (MA-42037) | 200° C. cm | 23 | 19 | 17.5 | 14.5 |
| | 230° C. cm | 34 | 28 | 22 | 17 |
| | 250° C. cm | 41 | 32 | 25 | 18.5 |
| Vicat (5 kg - 120° C./h) °C. (ASTM D-1525/A) | | 101 | 99 | 96 | 90 |

TABLE NO 3

Physical-mechanical characteristics of ABS resins obtained by two-step grafting of PB.

|  |  | Experimental Examples | | | |
|---|---|---|---|---|---|
|  |  | 1 | 2 | 3 | 4 |
| Graft polymer fraction % pp | | 20 | 35 | 50 | 70 |
| ST/ACN copolymer fraction % pp | | 80 | 65 | 50 | 30 |
| Resilience, IZOD ¼" + 23° C. J/m (ASTM D-256) | | 30 | 210 | 320 | 330 |
| Hardness "R" — (ASTM D-785) | | 116 | 109 | 98 | 86 |
| Helix fluidity: T = (MA-42037) | 200° C. cm | 26 | 23 | 21 | 17 |
| | 230° C. cm | 37 | 31 | 28 | 22 |
| | 250° C. cm | 41 | 39 | 32 | 27 |
| Vicat (5 kg - 120° C./h) °C. (ASTM D-1525/A) | | 101 | 99 | 97 | 90 |

TABLE NO 4

Physical-mechanical characteristics of ABS resins obtained by traditional grafting and monomodal PB.

|  |  | Comparative Examples | | |
|---|---|---|---|---|
|  |  | 1 | 2 | 3 |
| Graft Polymer fraction % pp | | 20 | 35 | 50 |
| ST/ACN copolymer fraction % pp | | 80 | 65 | 50 |
| Resilience, IZOD ¼" + 23° C. J/m (ASTM D-256) | | 25 | 40 | 60 |
| Hardness "R" — (ASTM D-785) | | 116 | 111 | 104 |
| Helix fluidity: T = (MA-42037) | 200° C. cm | 26 | 23 | 20 |
| | 230° C. cm | 34 | 27 | 21 |
| | 250° C. cm | 43 | 35 | 27 |
| Vicat (5 kg - 120° C./h) °C. (ASTM D-1525/A) | | 101 | 99 | 97 |

TABLE No 5

Physical-mechanical characteristics of ABS resins obtained by traditional grafting and bimodal PB

|  |  | Comparative Examples | | | |
|---|---|---|---|---|---|
|  |  | 1 | 2 | 3 | 4 |
| Graft polymer fraction % pp | | 20 | 35 | 50 | 70 |
| ST/ACN copolymer fraction % pp | | 80 | 65 | 50 | 30 |
| Resilience, IZOD ¼" + 23° C. J/m (ASTM D-256) | | 80 | 220 | 310 | 350 |
| Hardness "R" — (ASTM D-785) | | 115 | 108 | 100 | 89 |
| Helix fluidity: T = (MA-42037) | 200° C. cm | 24 | 20 | 18 | 15.5 |
| | 230° C. cm | 35 | 29 | 24 | 17 |
| | 250° C. cm | 44 | 37 | 29 | 20 |
| Vicat (5 kg - 120° C./h °C. (ASTM D-1525/A) | | 101 | 99 | 96 | 90 |

We claim:

1. An emulsion polymerization process for the preparation of grafted polymers comprising:

(a) in a first stage of the process, charging a reaction space with a monomodal polybutadiene latex having a particle diameter of from 800 to 2500 Angstroms in an amount from 80 to 90% of the total polybutandiene latex employed in the entire process;

(b) continuously feeding said reaction space with monomers of styrene and acrylonitrile in a weight ratio of from 60:40 to 80:20 at a temperature of from 50° to 80° C. in the presence of an initiator until 70 to 90% of said monomers react with said polybutadiene latex to form the grafted polymer; and (c) in a second stage of the process, feeding to the grafted polymer of the first stage the remaining amount of the polybutadiene latex and an additional amount of said monomers of styrene and acrylonitrile at a temperature of 50°-80° C. in the presence of initiator until 94–96% of the monomers have reacted with the polybutadiene latex to form said grafted polymer.

2. The process of claim 1 wherein the reaction is carried out in the presence of a stablizer-emusifier.

3. The process of claim 2 wherein the stabilizer-emulsifier is selected from soaps of fatty acids, alkyl sulfonates, arylalkyl, sulfonates and salts or resin acids.

4. The process of claim 3 wherein the stabilizer-emulsifier is selected from a potassium alkyl sulfonate and the sodium salt of disproportionated resin acid.

5. The process of claim 1 further comprising adding the stabilizer-emulsifier directly to the monomodal polybutadiene latex.

6. The process of claim 1 wherein the reaction is carried out in the presence of a water-soluble initiator.

7. The process of claim 6 wherein the water-soluble initiator is selected from peroxides, potassium persulfate, ammonium persulfate, hydroperoxides and peracids.

8. The process of claim 6 wherein the initiator is activated with a reducing agent selected from sodium bisulfate and salts or complexes of transition metals.

9. The process of claim 6 wherein the reaction is carried out in the presence of $Fe^{++}$-EDTA/cumene hydroperoxide or potassium persulfate.

10. The process of claim 8 wherein the reaction is carried out in the presence of $Fe^{++}$-EDTA/cumene hydroperoxide or potassium persulfate.

11. The process of claim 6 wherein the amount of the initiator is in the range of from 0.001 to 3.0 pphm.

12. The process of claim 11 wherein the amount of the initiator is in the range of from 0.005 to 1.0 pphm.

13. The process of claim 1 wherein the reaction is carried out in the presence of a chain transfer agent selected from mercaptans, thioesters and alpha-methyl-styrene-dimers.

14. The process of claim 13 wherein the amount of the chain transfer agent is from 0.001 to 2% by weight.

15. The process of claim 1 wherein the polybutadiene based graft copolymer contains an amount of polybutadiene of from 10 to 70% by weight.

16. The process of claim 15 wherein the polybutadiene based graft copolymer contains an amount of polybutadiene of from 40 to 60% by weight.

17. The process of claim 1 wherein the particles of the monomodal polybutadiene latex have a diameter in the range of from 1300 to 1600 Angstroms.

* * * * *

UNITED STATES PATENT AND TRADEMARK OFFICE
CERTIFICATE OF CORRECTION

PATENT NO. : 4,703,090

DATED : October 27, 1987

INVENTOR(S) : Andrea Ferraresi; Pierluigi Griselli

It is certified that error appears in the above—identified patent and that said Letters Patent is hereby corrected as shown below:

On the title page, please change the name of the Assignee to read --Enichem Tecnoresine S.p.A., Palermo, Italy--.

Signed and Sealed this

Twenty-sixth Day of April, 1988

Attest:

DONALD J. QUIGG

*Attesting Officer*      *Commissioner of Patents and Trademarks*